(12) United States Patent
Cairns

(10) Patent No.: US 7,464,728 B2
(45) Date of Patent: Dec. 16, 2008

(54) PIPE SEAL ASSEMBLY AND METHOD

(76) Inventor: James L. Cairns, 403 S. Atlantic Ave., Ormond Beach, FL (US) 32176

( * ) Notice: Subject to any disclaimer, the term of this patent is extended or adjusted under 35 U.S.C. 154(b) by 172 days.

(21) Appl. No.: 11/468,268

(22) Filed: Aug. 29, 2006

(65) Prior Publication Data

US 2007/0044858 A1    Mar. 1, 2007

Related U.S. Application Data

(60) Provisional application No. 60/712,094, filed on Aug. 29, 2005.

(51) Int. Cl.
*F16L 55/16* (2006.01)
(52) U.S. Cl. .................. 138/99; 138/155; 138/103; 285/373; 285/197
(58) Field of Classification Search ............ 138/99, 138/97, 103, 155; 285/373, 197, 267
See application file for complete search history.

(56) References Cited

U.S. PATENT DOCUMENTS

| | | | |
|---|---|---|---|
| D29,198 S | 1/1898 | Armstrong et al. | |
| 1,129,615 A | 2/1915 | Sykes | |
| 2,094,258 A * | 9/1937 | Thompson | 138/99 |
| 2,146,067 A * | 2/1939 | Graham | 285/373 |
| 2,291,709 A | 8/1942 | Goetze | |
| 2,417,741 A | 3/1947 | Dillon | |
| 2,444,119 A | 6/1948 | Thorn et al. | |
| 2,913,262 A | 11/1959 | Cenzo et al. | |
| 3,671,046 A | 6/1972 | Hagman | |
| 3,861,422 A * | 1/1975 | Christie | 138/99 |
| 3,915,461 A | 10/1975 | Gautier | |

(Continued)

FOREIGN PATENT DOCUMENTS

WO    WO 95/02267    1/1995

OTHER PUBLICATIONS

Applied Physics Laboratory, Reference Manual on Interference Seals and Connectors for Undersea Electrical Applications, University of Washington, Seattle, Washington, Jul. 1976.

*Primary Examiner*—Patrick F Brinson
(74) *Attorney, Agent, or Firm*—Procopio, Cory, Hargreaves & Savitch LLP

(57) ABSTRACT

A two-part housing grips and surrounds a portion of a pipe, with ports at first and second ends of the housing through which the pipe extends. An annular end seal of elastomeric material at each end of the housing provides a seal between the pipe and housing. The end seals each have one slit for allowing the seals to be engaged transversely over the pipe. Each port has an annular recess for enclosing the respective end seals. The cross-sectional area of each end seal in a relaxed condition is greater than the cross sectional area defined between the outer surface of the pipe and the annular recess in the housing when the housing is closed around the pipe, so that the end seals are squeezed between the opposing surfaces of the pipe and housing when the two parts of the housing are secured around the pipe. Face seals extend between the end seals on opposite sides of the housing to seal the intersection between the two housing parts.

35 Claims, 7 Drawing Sheets

U.S. PATENT DOCUMENTS

| | | | |
|---|---|---|---|
| 3,944,260 A * | 3/1976 | Petroczky | 285/15 |
| 4,015,634 A * | 4/1977 | Christie | 138/99 |
| 4,111,234 A | 9/1978 | Wells et al. | |
| 4,117,259 A | 9/1978 | Giebel et al. | |
| 4,155,561 A | 5/1979 | Rudy et al. | |
| 4,157,195 A | 6/1979 | Costanzo et al. | |
| 4,465,330 A | 8/1984 | De Cenzo | |
| 4,529,257 A | 7/1985 | Goodman et al. | |
| 4,695,259 A | 9/1987 | Uchida | |
| 4,768,813 A | 9/1988 | Timmons | |
| 4,780,091 A | 10/1988 | Shenton | |
| 4,839,471 A | 6/1989 | Clark et al. | |
| 4,857,672 A | 8/1989 | Rebers et al. | |
| 4,874,326 A | 10/1989 | Marolda, Jr. | |
| 4,909,751 A | 3/1990 | Marolda, Jr. | |
| 5,248,263 A | 9/1993 | Sakurai et al. | |
| 5,267,738 A | 12/1993 | Vos | |
| 5,510,577 A | 4/1996 | Corrigan | |
| 5,561,268 A | 10/1996 | Dagan et al. | |
| 5,639,102 A | 6/1997 | Ilesic | |
| 5,675,124 A | 10/1997 | Stough et al. | |
| 5,695,197 A | 12/1997 | Farley et al. | |
| 5,853,030 A | 12/1998 | Walding | |
| 5,873,750 A | 2/1999 | Cairns et al. | |
| 5,884,003 A | 3/1999 | Cloud et al. | |
| 5,896,486 A | 4/1999 | Burek et al. | |
| 5,947,533 A | 9/1999 | Fisher et al. | |
| 6,045,383 A | 4/2000 | Fujiwara | |
| 6,067,395 A | 5/2000 | Cairns et al. | |
| 6,177,634 B1 | 1/2001 | Smith | |
| 6,314,229 B1 | 11/2001 | Sasaki et al. | |
| 6,332,787 B1 | 12/2001 | Barlow et al. | |
| 6,334,785 B2 | 1/2002 | Miwa | |
| 6,336,472 B1 | 1/2002 | Eminger et al. | |
| 6,338,492 B1 | 1/2002 | Schilling et al. | |
| 6,475,008 B1 | 11/2002 | Marolda et al. | |
| 6,573,455 B1 | 6/2003 | Radelet | |
| 6,901,967 B1 * | 6/2005 | Kuenzer | 138/99 |
| 6,971,413 B2 | 12/2005 | Taylor et al. | |
| 6,981,704 B2 | 1/2006 | Okazaki et al. | |
| 7,004,476 B2 | 2/2006 | Nakayama et al. | |
| 2004/0108010 A1 | 6/2004 | Gaston et al. | |
| 2004/0262851 A1 | 12/2004 | Tones et al. | |

* cited by examiner

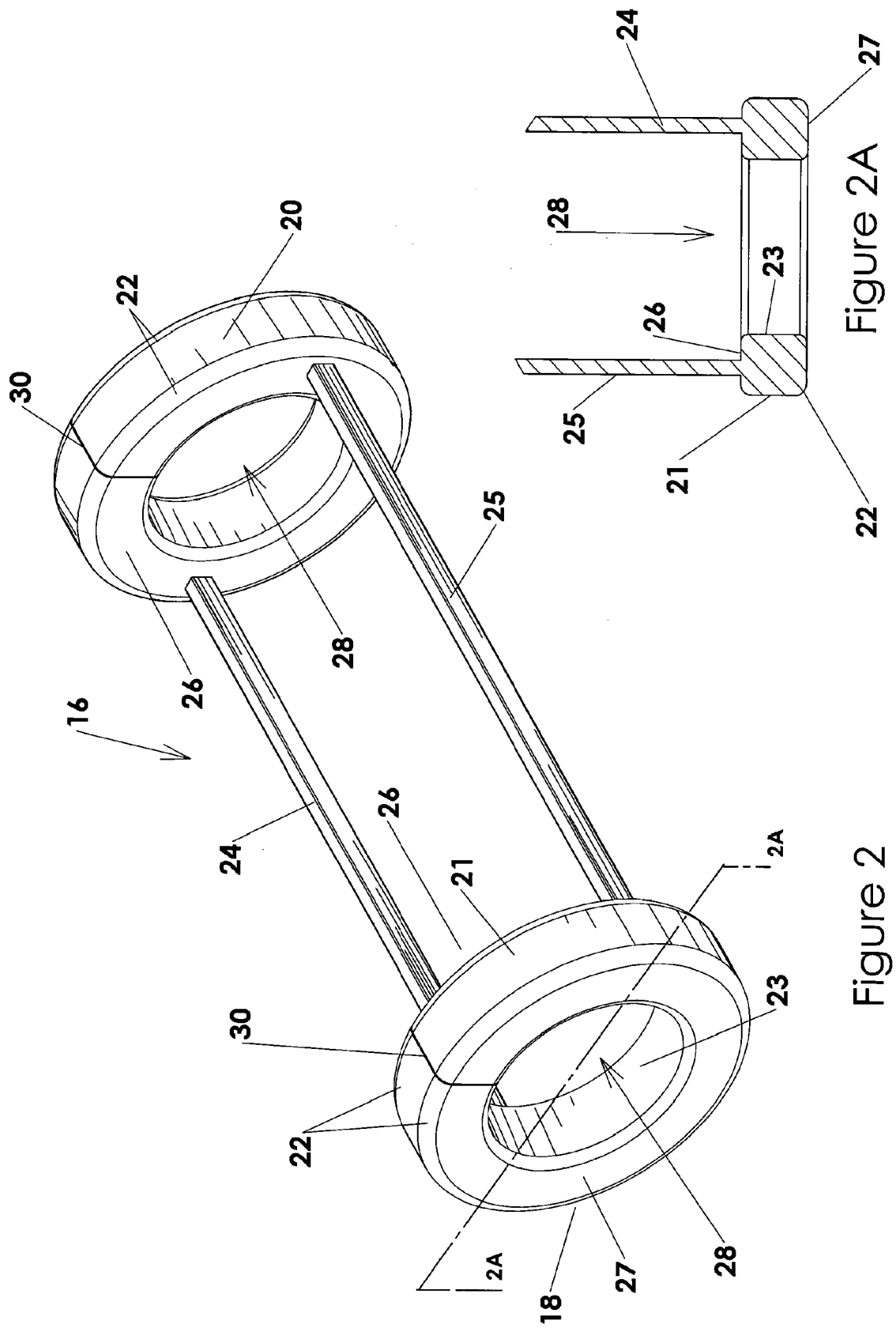

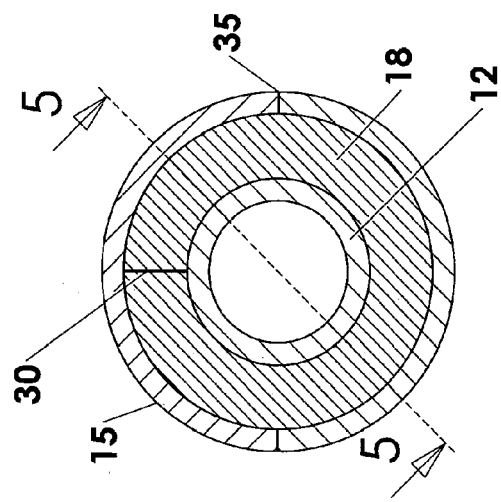
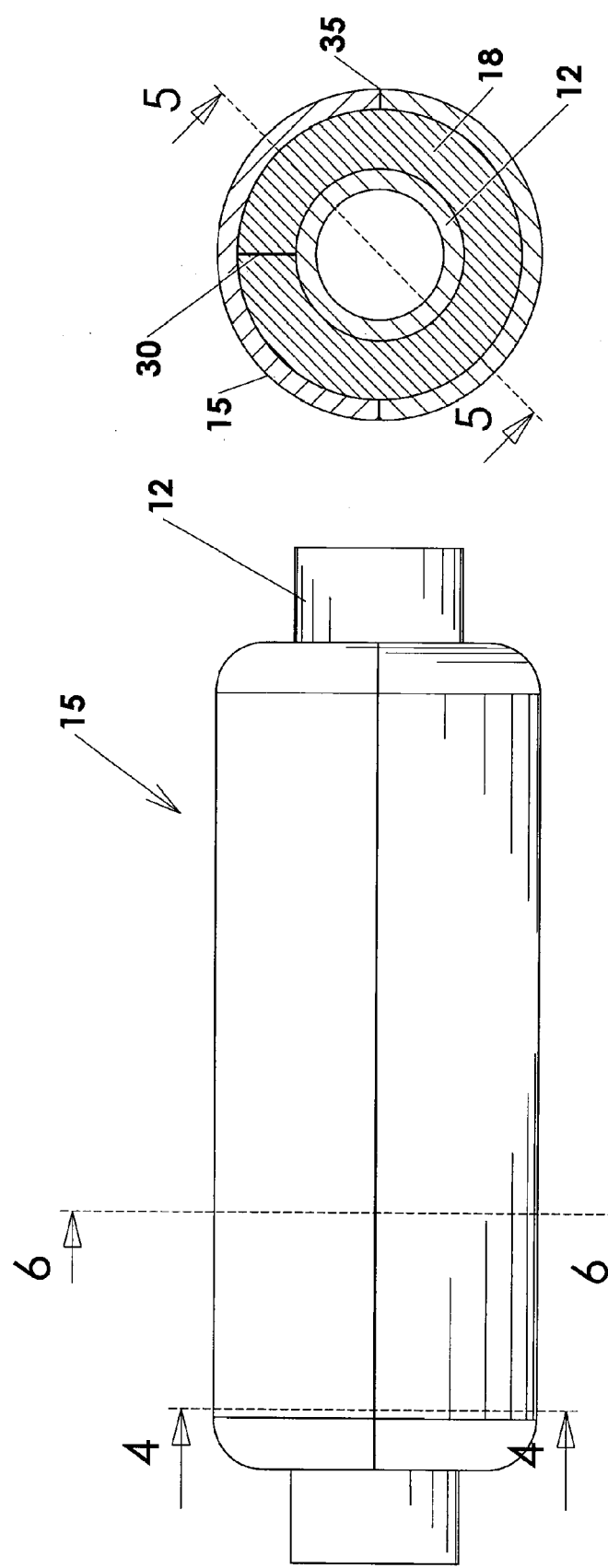
Figure 4
Figure 3

PIPE SEAL ASSEMBLY AND METHOD

RELATED APPLICATION

The present application claims the benefit of U.S. provisional patent application No. 60/712,094, filed on Aug. 29, 2005, which is incorporated herein by reference in its entirety.

BACKGROUND

1. Field of the Invention

The present invention relates generally to repair, splicing or tapping of pipes, and is particularly concerned with a seal assembly and method for sealing a section of a pipe which is damaged or at which a junction is to be added.

2. Related Art

It is difficult to seal a long, thin object such as a pipe when the ends of the pipe are inaccessible. This means that it is often necessary to cut and splice a pipe in order to repair it when the pipe is damaged or leaking. It is also difficult to tap into a pipe without cutting it. Existing pipe repair systems tend to be relatively complex and can be difficult to install. One example of a pipe repair and sealing device is U.S. Pat. No. 4,111,234 in which separately formed, opposing semi-cylindrical body portions are clamped around a leaking pipe sections, with sealing gaskets clamped between the body portions.

SUMMARY

According to one embodiment of the invention, a system and method for sealing a length or portion of a pipe comprises a two part housing for gripping and surrounding a portion of a pipe, with openings at opposite ends of the housing adapted to grip the pipe as it passes into and out of the housing, and an end seal mounted at each end of the housing for providing a seal between the pipe and housing. Each end seal is of elastomeric material and is of annular cross-section with an inner surface for engaging around the pipe and an outer surface for engaging an opposing surface of the housing. The end seals each have at least one slit for allowing the seals to be engaged transversely about the tube at opposite ends of the housing. The housing has an annular recess or cavity at each end for enclosing the respective end seals. The cross-sectional area of each end seal in a relaxed condition is greater than the cross sectional area defined between the outer surface of the pipe and the annular recess in the housing when the housing is closed around the pipe. This means that the end seals are squeezed between the opposing surfaces of the pipe and housing when the two parts of the housing are secured around the pipe, whereby a sealing pressure is induced elastically between the inner and outer surfaces of the seal and the opposing surfaces of the pipe and groove. Opposing surfaces of the slit in the seal are pressed together with the same elastically induced sealing pressure, so that the slit does not affect the integrity of the end seal.

The end seals may each have only one slit in one embodiment, or may have two slits separating each end seal into two parts, with each seal part temporarily secured in opposite parts of the housing until it is closed and secured about the pipe.

This seal assembly may be used to seal any type of pipe or conduit, including a rigid pipe, hydraulic hose, air hose, plastic tubing or any other sort of tube for carrying various types of fluids or other materials.

The housing may comprise two completely separate housing parts which are clamped together around the pipe section to be enclosed, or may be a clamshell-like housing in which the two housing parts are hinged together along one side of the housing and releasably clamped together along the other side when the housing is closed. In one embodiment, side runner seals extend between the end seals along opposite sides of the housing, with the side runner seals gripped between opposing rims of the two housing parts when they are closed and secured about the pipe section, so as to completely seal the housing. The slit in each end seal is offset from junctions between the end seal and the two side runner seals.

The seal assembly may be used to enclose and seal a damaged, spliced or repaired section of a pipe without having to cut the pipe to allow seal installation, and may also be used to create a junction.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 2 is a perspective view of the combined end seal and side seal device of FIG. 1;

FIG. 2A is a cross-section through one end seal on the lines 2A-2A of FIG. 2;

FIG. 3 is a side view of the seal assembly of FIG. 1 in a closed position, on a reduced scale;

FIG. 4 is a sectional view on the lines 4-4 of FIG. 3;

FIG. 6A is an enlarged view of the circled area A of FIG. 6;

DETAILED DESCRIPTION

Figure 1:
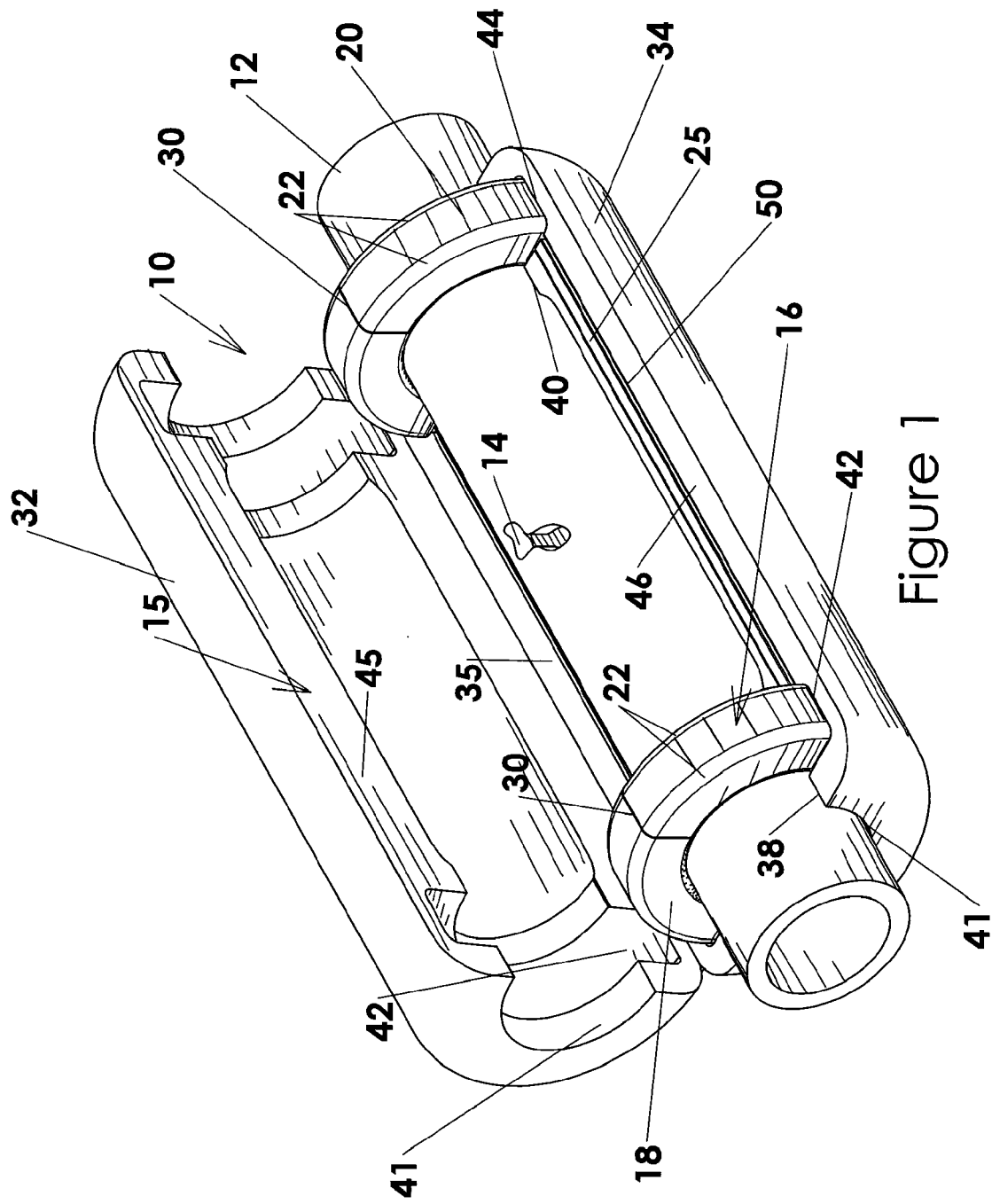
FIG. 1 is a perspective view of a pipe seal assembly of one embodiment installed about a damaged pipe section, with the housing in an open position.

Certain embodiments as disclosed herein provide for systems and methods for repair or tapping of pipes. In this disclosure, the term "pipe" refers to any type of rigid or soft conduit, such as a rigid pipe, hose, or any other sort of tubing. The embodiments disclosed herein are particularly concerned with a seal assembly and method for sealing a section of a pipe such as a rigid pipe, hose, or the like which is damaged or at which a junction is to be added.

After reading this description, it will become apparent to one skilled in the art how to implement the invention in various alternative embodiments and alternative applications. However, although various embodiments of the present invention will be described herein, it is understood that these embodiments are presented by way of example only and not limitation. As such, this detailed description of various alternative embodiments should not be construed to limit the scope or breadth of the present invention as set forth in the appended claims.

FIGS. 1 to 6 illustrate a first embodiment of a pipe seal assembly 10 for sealing a section of a tube or pipe 12 which has a damaged portion 14. The pipe may be a rigid pipe such as a water pipe, gas pipe, oil pipe, a pipe for conveying chemicals in a chemical plant, or the like, or may be a hydraulic hose, air hose, medical tubing or any other type of tubing, including flexible tubing. The seal assembly comprises a two part outer case or housing 15 of rigid material such as metal, hard plastic or the like for enclosing and gripping a damaged section of pipe 12, and a combined end seal and side seal device 16 of resilient material trapped between the opposing parts of the case when the case is closed, as illustrated in FIGS. 3 to 6. FIG. 2 illustrates the seal device 16 separate from the case 15.

The seal device 16 comprises first and second spaced, tubular end seals 18,20 of generally rectangular cross-section in the axial direction, as best seen in FIG. 2A, each end seal having an outer cylindrical face 21 and an inner cylindrical face 23, and opposite, substantially flat inner and outer end faces 26,27. Each end seal may have rounded edges 22 at each end at the junction between the outer surface and the respective end face, as illustrated in FIG. 2A. A pair of elongate side runner seals or face seals 24, 25 extend between the opposite inner end faces 26 of the end seals. The side runner seals may be of round or O-ring-like cross section, or of rectangular cross section, and are of rectangular cross-section in the illustrated embodiment, as described in more detail below in connection with FIGS. 6 and 6A. The end seals and side runner seals may be formed integrally, or may be formed separately with the side runner seals then suitably bonded to the end seals at the appropriate locations. In certain applications where the case or housing is made from a resilient material, the side runner seals may be integrally formed into opposite sides of face 46. The central opening 28 of each end seal is designed to be a close or interference fit over the pipe. Each end seal has an axial slit 30 extending between its inner and outer surface and between its opposite end faces, as illustrated in FIGS. 1, 2 and 4, which enables the seal device to be easily installed transversely over pipe 12. The slits 30 are offset from the side runner or face seals 24, 25.

Seal device 16 may be of any suitable relatively soft, elastic and substantially incompressible material, such as an elastomeric or rubber-like material. The material is selected to be chemically compatible with all elements or compounds with which it is likely to come into contact.

The case or housing 15 may be formed as two completely separate halves or parts, but in the illustrated embodiment it is a clamshell-like housing with first and second parts 32, 34 hinged together by suitable hinges 35 along one side of the housing for movement between the open position of FIG. 1 and the closed position of FIGS. 3 to 6. The housing or case parts may be secured together in the closed position by any suitable fastener or clamping mechanism, such as latches, bolts or the like along the non-hinged side of the housing or clamping devices engaging over the closed housing. The case or housing parts 32,34 together define an elongate chamber 36 having end ports 38, 40 at opposite ends of the housing through which the pipe 12 extends, with annular recesses 42, 44 in the respective end ports in which the end seals 18, 20 are seated. The opposing semi-circular surfaces 41 at the outer rim of each end port outside recess 42, 44 are appropriately sized to grip the tube 12 in order to resist axial sliding of the tube through the housing 15.

Although the housing in the illustrated embodiment is generally cylindrical with aligned end ports at opposite ends of the housing, it may be of different shapes in alternative embodiments. For example, the housing may have a bend or elbow, such that the end ports are at an angle and not directly opposite one another. This would allow sealing over a pipe with a bend, or over a tube of relatively flexible material, such as medical tubing.

Figure 6:
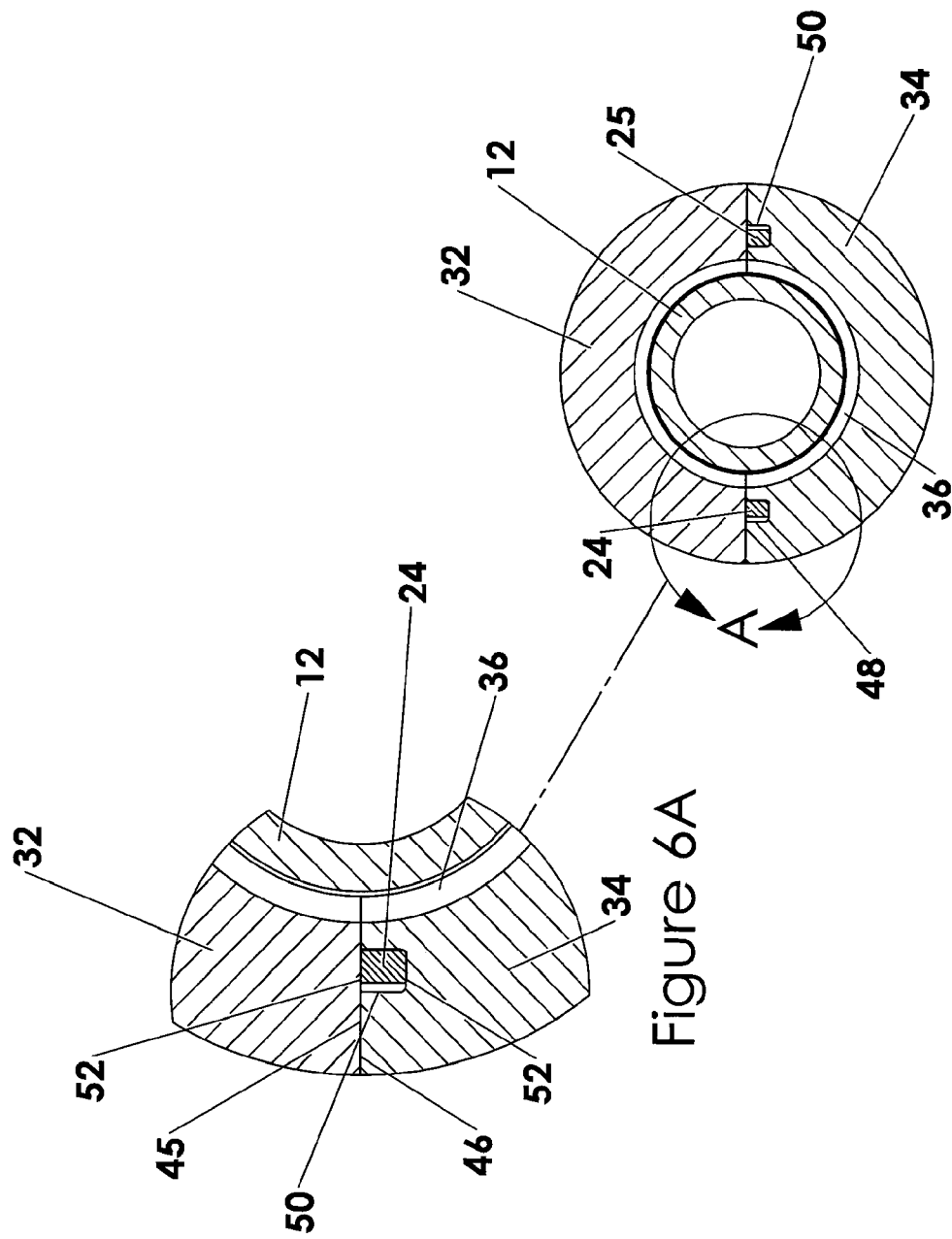
FIG. 6 is a sectional view on the lines 6-6 of FIG. 3.

The housing parts 32, 34 have opposing flat rims or faces 45, 46 respectively, which are in face-to-face engagement when the housing is in the closed position with the two parts secured together. Elongate side runner grooves 48, 50 are provided in the face 46 of part 34 between the inner ends of the recesses 42, 44, respectively, and the side runner seals 24, 25 are seated in the respective grooves, as best illustrated in FIGS. 1 and 6. As seen in FIG. 6, the side runner seals comprise band-like face seals of generally rectangular cross section, and also have rounded edges 52 along each side, similar to the rounded edges at the opposite ends of end seals 18, 20. However, the side runner seals may be linear O-ring seals of round cross-section in alternative embodiments. The side runner seals form a face seal between opposing faces of the two case parts when the case is closed.

Figure 5:
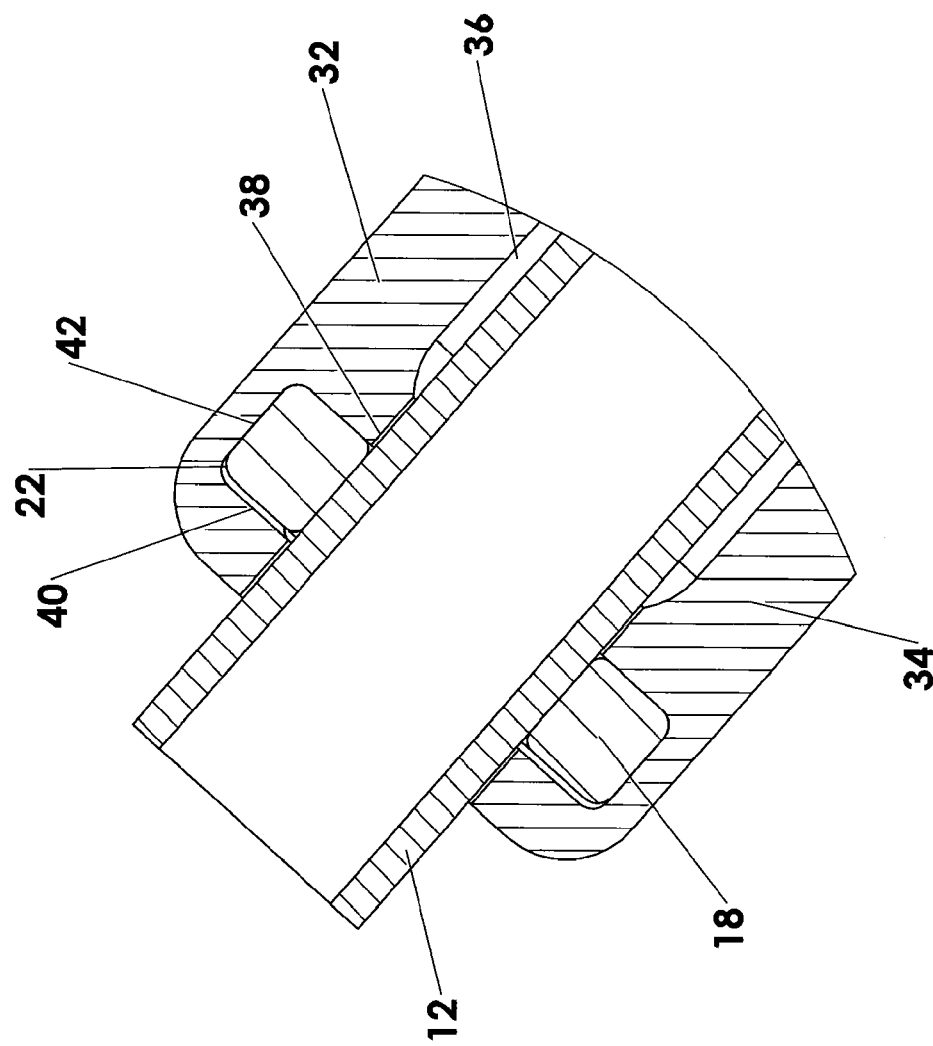
FIG. 5 is a sectional view on the lines 5-5 of FIG. 4.

The relative dimensions of the end seals 18, 20 and the cavities in which they reside are selected so that the seals are squeezed radially between the opposing outer surface of the pipe and inner surfaces of the recesses 42, 44. Each end seal 18,20 is under enough radial squeeze when the case is closed to form an adequate sealing pressure between the inner and outer faces of the seal and the opposing outer face of the pipe and inner face of the respective recess in which the seal is located. At the same time, the opposing faces of the slit 30 are squeezed together with an equivalent sealing pressure, due to the radial squeeze applied to each end seal when the case is closed. This is achieved because the radial cross-sectional area of the seals 18, 20 slightly exceeds the cross-sectional area of the cavity or recess in which each seal resides. The relative dimensions are also selected so that there is a small gap between each seal and the recess or cavity in which it is located after closing the case, as can be seen in FIG. 5. This is to allow for thermal or chemical expansion of the seal.

The same dimensional requirements apply to both the end seals and associated recesses, and to the side runner seals and grooves in which they are seated. As can be seen in FIG. 1, the side runner seal 25 in a non-squeezed or relaxed condition projects out of the groove 50 and above the flat surface 46, as does the other side runner seal 24 which is not visible in FIG. 1. This means that the seals 24 and 25 are squeezed between the inner face of the respective grooves 48, 50 and the opposing portion of face 45 when the other part 35 of the case is closed over part 34, as in FIG. 6 and 6A. It can be seen in FIG. 6A that there is a gap between the end wall of the groove 50 and the corresponding side face of the side runner or face seal 24, to allow for thermal or chemical expansion of the seal.

The pipe seal assembly of FIGS. 1 to 6 can be used to seal a damaged region or leak in a pipe or tube relatively quickly and easily when the ends of the pipe are not accessible, without having to cut the pipe. The end seals 18, 20 are first installed transversely over the pipe at spaced locations on opposite sides of a damaged region or leak 14 in the pipe. This can be done by separating each end seal at the split 30 to form an opening through which the pipe or tube can be installed. The pipe is then cradled in the first half or part 34 of the case with the end seals seated in the respective halves of the seal seating recesses or cavities 42, 44 at opposite ends of the case, as illustrated in FIG. 1. At the same time, the side runner seals are received in the respective side runner grooves 48, 50.

The second half or part 32 of the case is then closed over the first part, squeezing the end seals in the respective recesses and simultaneously squeezing the face or side runner seals in the respective grooves. This forms a seal between opposing faces of the pipe and case at each end of the case, and a seal between the opposing surfaces of case parts 32 and 34. The seal assembly of this embodiment therefore permits simultaneous sealing of the pipe 12 and the split case 15 penetrated by the pipe. If the external pressure outside case 15 is higher than the pressure in chamber 36, the seals are energized by forcing them against the end of the cavity opposite to the applied external pressure. The assembly can also support high internal pressure in the case. Relatively high pressures can be supported with this arrangement if the pipe or hose 12 is of rigid material. For softer tubing, the seal assembly supports a modest external pressure and a high internal pressure.

Figure 7:
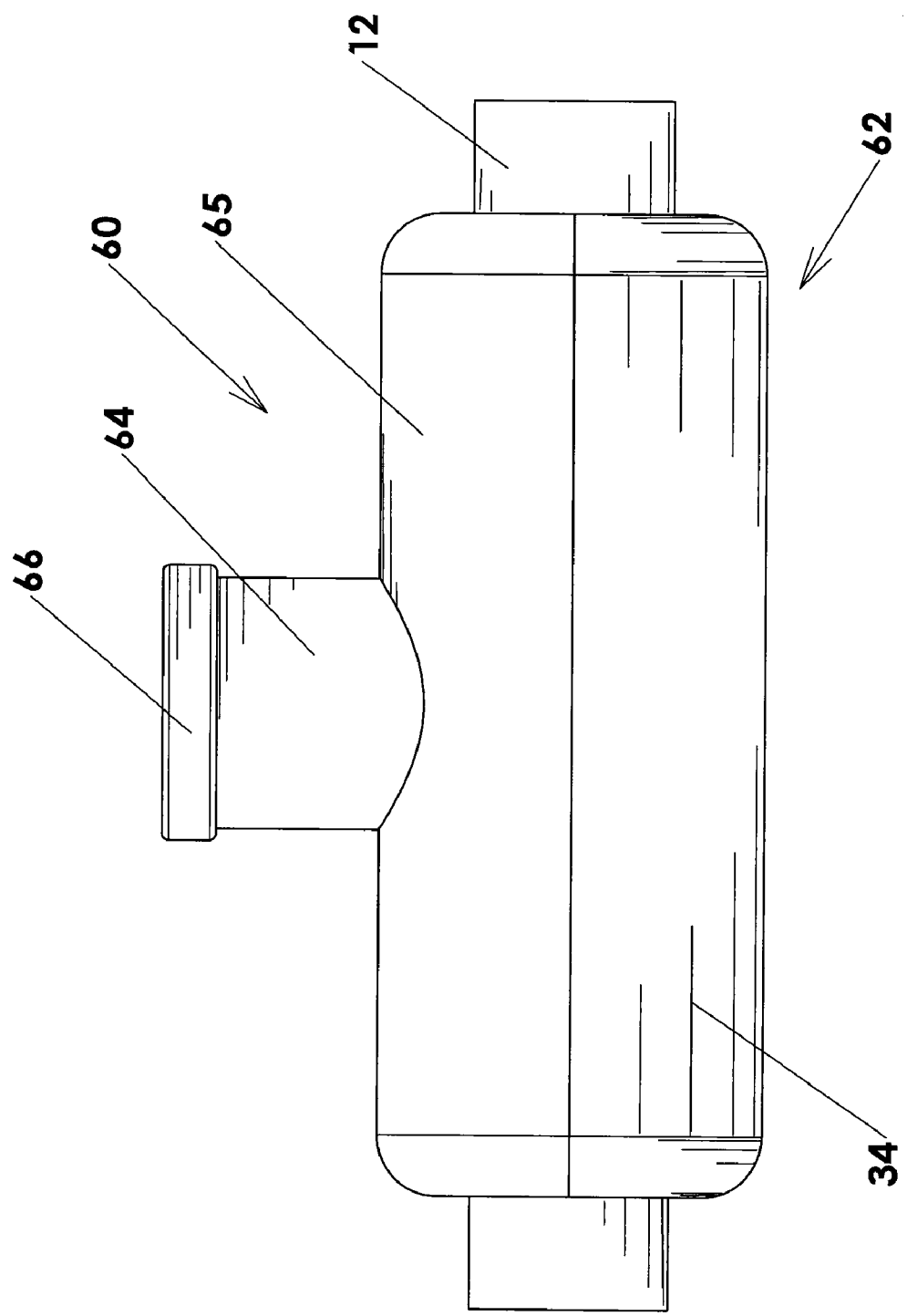
FIG. 7 is a side elevation view of a modified pipe seal assembly with a transverse or take-out port in the casing or outer housing.
Figure 8:
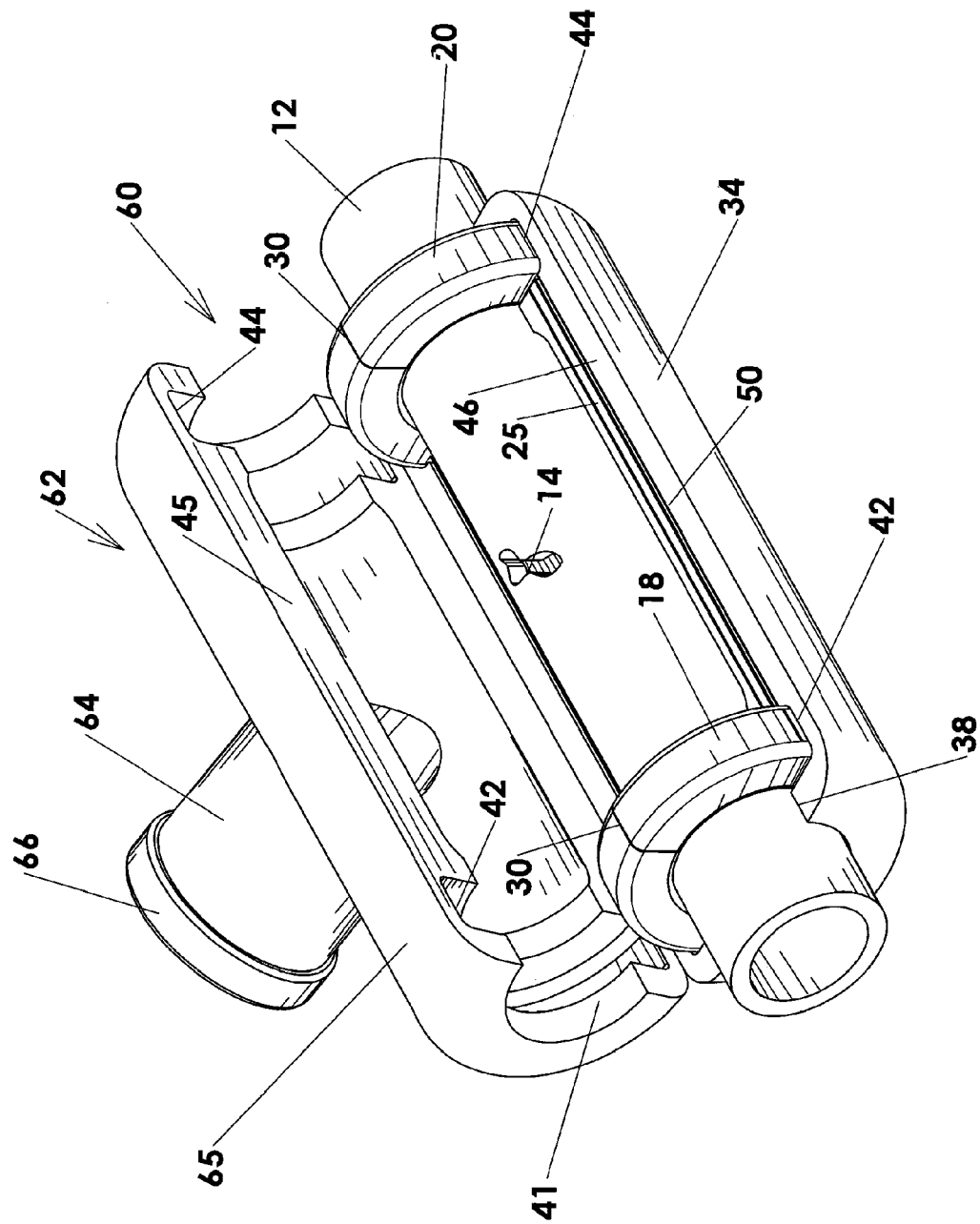
FIG. 8 is a perspective view of the embodiment of FIG. 7 in an open position.

FIGS. 7 and 8 illustrate a modified pipe seal assembly 60 in which a "T" junction is formed in one part 65 of the outer case or housing 62 by providing a transverse tubular port or passageway 64 at a selected position on part 65. A coupling 66 is provided at the outer end of port 64 for securing a second tube or pipe to the port 64. Clearly, multiple ports could be present in either or both halves of the housing. The coupling 66 may be a hose fitting as illustrated in the drawings or any type of conventional pipe or tubing attachment or coupling device. In the case of a medical device, for instance, it could simply be an elastomeric plug housed in the coupling device which would allow a hypodermic needle to sealably pass into the cavity and simultaneously penetrate the encapsulated section of tubing, as might be desirable for injecting material into the enclosed tube. The seal assembly of FIGS. 7 and 8 is otherwise identical to that of FIGS. 1 to 6, and like reference numerals have been used for like parts as appropriate.

The pipe or tube seal assembly or junction 60 of this embodiment may be used to tap into a pipe or tube to create a junction. In this case, the hole 14 in the pipe could be made deliberately to provide a take-out aligned with take-out port 64. Although one take-out or pipe fitting attachment 66 is provided in the illustrated embodiment, one or more additional ports and attached take-outs or pipe fitting attachments may also be provided in the case 62 in alternative embodiments, to provide additional junctions for supplying fluid carried in tube 12 to other branch tubes. This arrangement may be useful, for example, in a household plumbing or sprinkler system.

The assembly 60 may be readily installed at any selected location along a length of a pipe 12. As noted above, this assembly may be used to provide a junction between two rigid pipes or a hose or other conduit junction. A hole 14 may first be made at a selected position in the pipe 12, and seal device 16 is then engaged over the pipe in the manner described above in connection with the previous embodiment, with the end seals 18, 20 engaging over the pipe on opposite sides of hole 14. The pipe 12 is then cradled in part 34 of the housing or case 62 with the housing in the open position of FIG. 8, with the end seals engaging in the respective halves of the recesses 42, 44 at opposite ends of the housing part 34. The upper or second part 65 of the housing is then closed over the part 34, simultaneously squeezing the end seals 18, 20 between the opposing surfaces of the tube 12 and the respective recesses 42, 44, and squeezing the side runner seals 24, 25 between the respective grooves 48, 50 in face 46 and the opposing portions of face 45. This closes and seals the assembly about the enclosed section of tube 12, including hole 14. The assembly 60 is appropriately positioned so that hole 14 is aligned with port 64 and take-out or tubular pipe fitting 66. This arrangement allows pipe 12 to be tapped in one or more places without cutting it.

The pipe seal assemblies described above may be used for repair purposes to seal a damaged or leaking portion of a pipe, hose, or other tube, to seal a splice in a pipe, or to form one or more junctions in a pipe or hose for tapping into the pipe without cutting it.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are, therefore, representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A pipe seal assembly, comprising:
a housing having end walls and first and second end ports in the end walls of predetermined shape and dimensions configured to grip a pipe extending through the housing;
the housing comprising first and second housing parts movable between a closed position enclosing and gripping the pipe and an open position;
the first end port having a first annular seal seating recess and the second end port having a second annular seal seating recess;
first and second end seals of elastomeric material mounted in the first and second seating recess, respectively, at each end of the housing for providing a seal between opposing surfaces of the pipe and housing;
each end seal comprising an annular member having a central opening for engaging over the pipe and an outer surface for engaging an opposing surface of the respective seating recess, and at least one axial slit extending through each end seal between the central opening and outer surface for allowing the seal to be opened at the slit to engage transversely over the pipe;
the radial cross-sectional area of each end seal in a relaxed condition being greater than the radial cross-sectional area defined between the outer surface of a pipe and the annular recess in the housing when the housing is closed around the pipe, whereby a sealing pressure is induced between the inner and outer surfaces of the seal and the opposing surfaces of the pipe and seating recess when the housing is closed around the pipe and the seals are in a sealed condition; and
first and second side runner seals extending between the end seals on opposite sides of the central opening in the end seals, the side runner seals being adapted to be squeezed between opposing surfaces of the housing parts in the closed position of the housing;
the slits being offset from the side runner seals.

2. The system of claim 1, wherein each end seal has only one slit.

3. The system of claim 1, wherein each end seal has two slits.

4. The assembly of claim 2, wherein the end seals and side runner seals are integrally formed in one piece.

5. A pipe seal assembly, comprising:
a housing having end walls and first and second end ports in the end walls of predetermined shape and dimensions configured to grip a pipe extending through the housing;

the housing comprising first and second housing parts movable between a closed position enclosing and gripping the pipe and an open position;

the first end port having a first annular seal seating recess and the second end port having a second annular seal seating recess;

first and second end seals of elastomeric material mounted in the first and second seating recess, respectively, at each end of the housing for providing a seal between opposing surfaces of the pipe and housing;

each end seal comprising an annular member having a central opening for engaging over the pipe and an outer surface for engaging an opposing surface of the respective seating recess, and at least one axial slit extending through each end seal between the central opening and outer surface for allowing the seal to be opened at the slit to engage transversely over the pipe;

first and second side runner seals extending between the end seals on opposite sides of the central opening in the end seals, the side runner seals being adapted to be squeezed between opposing surfaces of the housing parts in the closed position of the housing;

the radial cross-sectional area of each end seal in a relaxed condition being greater than the radial cross-sectional area defined between the outer surface of the pipe and the annular recess in the housing when the housing is closed around the pipe, whereby a sealing pressure is induced between the inner and outer surfaces of the seal and the opposing surfaces of the tube and seating recess when the housing is closed around the pipe and the seals are in a sealed condition; and each seating recess has opposite end walls and a gap is located between each end seal and at least one end wall of the respective seating recess in which the end seal is seated when the housing parts are in the closed position, whereby each end seal is free to distort axially in the respective recess when in the sealed, operating condition.

6. The assembly of claim 1, wherein each end seal is of generally rectangular cross section in the axial direction.

7. The assembly of claim 6, wherein each end seal has generally flat end faces and rounded junctions between each end face and the central opening and outer surface of the end seal.

8. The assembly of claim 1, wherein the housing has a central chamber extending between the end walls, the two housing parts having opposing side rims extending on opposite sides of the chamber between the first and second seal seating recess and adapted for engagement when the housing is in the closed position, the first housing part having a first side runner groove extending along one side rim between the first and second seal seating recesses and a second side runner groove along the opposite side rim extending between the first and second seal seating recesses, the first side runner seal being seated in the first side runner groove and the second side runner seal being seated in the second side runner groove.

9. The assembly of claim 8, wherein the side runner seals project out of the corresponding side runner grooves when the housing is in the open position.

10. The assembly of claim 9, wherein the side rims of the second housing part have flat portions facing the respective first and second side runner grooves in the closed position, whereby the side runner seals are squeezed between the respective side runner grooves and opposing flat portions of the second housing part to provide a sealing pressure for sealing the chamber when the housing parts are in the closed position.

11. The assembly of claim 9, wherein each side runner seal is of predetermined transverse dimensions less than the transverse dimensions of the side runner groove in which it is seated when the housing parts are in the closed position, whereby a space is provided between each side runner seal and the respective groove in the closed position.

12. The assembly of claim 1, wherein the housing has at least one transverse tubular port forming a T-shaped junction at a location spaced between the ends of the housing.

13. The assembly of claim 12, further comprising a coupling connected to an outer end of the transverse port for securing to an end of a second pipe extending transverse to the first pipe.

14. The assembly of claim 13, wherein the coupling comprises a hose fitting.

15. The assembly of claim 1, wherein the first and second housing parts are hinged together on one side of the housing to form a clamshell-like housing.

16. A pipe junction assembly, comprising:

a housing having a through bore for engaging over a first pipe and at least one transverse port communicating with the through bore;

at least one pipe coupling on the housing connected to the at least one transverse port and adapted to be coupled with a second pipe extending transverse to the first pipe;

the housing comprising first and second housing parts movable between an open position and a closed position closing and gripping a portion of the first pipe;

the transverse port being located on the first housing part;

the through bore having axial end ports of reduced diameter which grip the pipe in the closed position and an enlarged central chamber between the axial end ports, each axial end port having an annular seal seating recess;

first and second annular seal members located between the through bore and first pipe at opposite ends of the housing for providing a seal between the pipe and housing, each annular seal member having an outer circumferential surface which seals against an opposing inner surface of the respective seating recess and an inner circumferential surface which seals against an opposing outer surface portion of the first pipe in the closed position of the housing, each annular seal member being squeezed between the opposing outer surface portion of the first pipe and inner surface of the respective seating recess in the closed position and not completely filling the seating recess in an axial direction, whereby each annular seal member is free to distort axially in the respective seating recess in the closed position; and first and second elongate side seal members located between opposing portions of the housing parts on opposite sides of the housing in the closed position for sealing the housing.

17. The assembly of claim 16, wherein the first side seal member has opposite first and second ends secured to the first and second annular seal members, and the second side seal member has opposite first and second ends secured to the first and second annular seal members at locations spaced from the first and second ends of the first side seal member.

18. The assembly of claim 17, wherein the first and second side seal members are formed integrally with the first and second annular seal members.

19. The assembly of claim 16, wherein each side seal member is of circular transverse cross-section.

20. The assembly of claim 16, wherein each side seal member is of generally rectangular cross section.

21. The assembly of claim 16, wherein the first and second annular seal members each have at least one axial slit offset from the junction between the first and second housing parts in the closed position.

22. A pipe seal assembly, comprising:
- a housing having first and second end ports at first and second ends of the housing;
- a pipe extending through the housing via the end ports;
- the housing comprising first and second parts movable between a closed position enclosing and holding a portion of the pipe within the housing, and an open position releasing the pipe, the housing parts having first and second opposing faces configured for engagement in the closed position;
- each end port being of predetermined dimensions for gripping an outer surface of the pipe and having an enlarged annular cavity;
- a first annular seal member of elastomeric material seated in the annular cavity of the first end port and having opposing inner and outer surfaces squeezed in a radial direction between the outer surface of the pipe and an opposing surface of the cavity to provide a first end seal which seals the first end of the housing when the housing parts are in the closed condition;
- a second annular seal member of elastomeric material seated in the annular cavity of the second end port and having opposing inner and outer surfaces squeezed in a radial direction between the outer surface of the pipe and an opposing surface of the cavity to provide a second end seal which seals the second end of the housing when the housing parts are in the closed condition; and
- each annular seal member having at least one axial slit extending between an inner and outer surface of the seal member which is offset from the opposing faces of the housing parts in the closed position.

23. The assembly of claim 22, further comprising first and second side runner seals each located between the first and second opposing faces of the housing parts in the closed position, the housing having an internal chamber through which the pipe extends, the first side runner seal extending between the first and second annular seal members on a first side of the chamber and the second side runner seal extending between the first and second annular seal members on a second, opposite side of the chamber.

24. The assembly of claim 23, wherein the annular seal members and side runner seals are all formed integrally.

25. The assembly of claim 23, wherein the first opposing face has a first seating groove in which the first side runner seal is seated and a second seating groove in which the second side runner seal is seated, portions of the second opposing face which face the first and second seating grooves comprising flat surfaces having no indentations, and each side runner seal having opposite surfaces for sealing engagement between the respective seating groove and an opposing portion of the second opposing face.

26. The assembly of claim 22, wherein the housing has an internal chamber in the closed position enclosing a portion of the pipe and at least one tee junction port communicating with the chamber extending transverse to the longitudinal axis of the housing, the pipe portion within the chamber having at least one hole, and a second pipe is connected to the tee junction port for communication with the first pipe through the hole.

27. The assembly of claim 22, wherein each annular seal member is of generally rectangular cross section in an axial direction.

28. The assembly of claim 27, wherein each annular seal member has opposite end faces and inner and outer cylindrical surfaces extending between the end faces, the junctions between each end face and the inner and outer cylindrical surfaces being rounded.

29. The assembly of claim 22, wherein the pipe is of at least substantially rigid material.

30. The assembly of claim 22, wherein the pipe is a hose of non-rigid material.

31. A pipe repair method, comprising:
- engaging annular elastomeric end seal members transversely over spaced locations on a pipe via a respective axial slit in each end seal member, the end seal members being positioned on opposite sides of a damaged portion of the pipe;
- engaging the end seal members in spaced first and second seating cavities at first and second ends of a first housing part with the damaged portion of the pipe extending through a chamber-forming cavity in the first housing part;
- positioning side runner seals to extend between the end seal members along opposite sides of the chamber-forming cavity at a location offset from the respective axial slits in the end seal members;
- closing a second housing part over the first housing part and engaging third and fourth seating cavities at opposite ends of the second part over the exposed portions of the respective end seal members, whereby the first and third seating cavities and the second and fourth seating cavities form respective annular seating cavities which contain the end seal members about the pipe;
- as the second housing part is closed over the first housing part, simultaneously squeezing the annular seal members between the outer surface of the pipe and the opposing surfaces of aligned seating cavities in the two housing parts at the respective ends of the housing to produce a sealing engagement between the outer surface of each seal member and the opposing inner surface of the respective seating cavity and a sealing engagement between the inner surface of each seal member and the opposing outer surface of the pipe to seal the interface between opposite ends of the housing and the pipe while leaving a space in each seating cavity whereby each seal member is free to distort axially while sealing the respective end of the housing; and
- simultaneously squeezing the side runner seals between opposing side portions of the first and second housing parts to seal the damaged portion of the pipe in the chamber.

32. The method of claim 31, wherein the step of positioning side runner seals to extend between the end seal members comprises locating the side runner seals in first and second grooves extending along side portions of the first housing part located on opposite sides of the chamber such that portions of each side runner seal project outwardly from the respective groove in which it is seated.

33. The method of claim 32, wherein the step of squeezing the side runner seals between opposing side portions of the first and second housing parts comprises squeezing each side runner seal between the respective groove and an opposing flat portion of the second housing part.

34. A method of creating a junction between two pipes, comprising:
- forming a hole at a selected location in a first pipe;
- engaging annular elastomeric end seal members transversely over spaced locations on a pipe via a respective axial slit in each end seal member, the end seal members being positioned on opposite sides of the hole location;

closing first and second housing parts over the first pipe so that the first pipe extends out through end ports in first and second ends of a housing formed by the closed housing parts and the hole location is enclosed in a chamber in the housing;

as the second housing part is closed over the first housing part, squeezing the annular seal members radially between the outer surface of the first pipe and the opposing surfaces of seating cavities in the respective end ports to seal the interface between opposite ends of the housing and the first pipe, and sealing the intersection between the first and second housing parts to seal the chamber; and attaching a second pipe to a tee-junction port in one housing part which extends transverse to the first pipe and communicates with the chamber, whereby the first and second pipes communicate via the hole in the first pipe.

35. The assembly of claim 22, wherein the annular seal members do not completely fill the respective annular cavities in which they are seated when the housing parts are in the closed position.

* * * * *